Nov. 17, 1925.  A. PERRIN  1,562,046

OPTICAL INSTRUMENT

Filed Jan. 4, 1924

Arthur Perrin INVENTOR.

BY Jn. P. Livermore
ATTORNEY.

Patented Nov. 17, 1925.

1,562,046

UNITED STATES PATENT OFFICE.

ARTHUR PERRIN, OF BROOKLINE, MASSACHUSETTS.

OPTICAL INSTRUMENT.

Application filed January 4, 1924. Serial No. 684,424.

*To all whom it may concern:*

Be it known that I, ARTHUR PERRIN, a citizen of the United States, and resident of Brookline, in the county of Norfolk and State of Massachusetts, have invented an Improvement in Optical Instruments, of which the following description, in connection with the accompanying drawing, is a specification, like reference characters on the drawing designating like parts.

This invention is embodied in an optical instrument in which the lenses or optical elements are mounted in spectacle frames comprising two pairs or spectacles in tandem arrangement, so connected that the instrument may be retained supported on the head of the user, leaving the hands free.

The object of the invention is to provide a microscopic or magnifying instrument of this character, in which the object may be seen considerably magnified and in the proper field of vision of both eyes at a substantially greater distance from the eyes than is possible with a simple magnifying glass or loupe such as commonly used by surgeons, watch makers, or others dealing with small objects which have to be seen magnified for proper handling.

In the construction forming the subject of the present invention, the objective lenses in the front spectacle frame are convex, and of considerable magnifying power, while the eye-piece lenses are concave, and the objective lenses are spaced at a substantially less distance apart than the eye-piece lenses in the rear spectacle frame, so that when the objective lenses in the front frame are supported at a proper distance in advance of the eye-piece lenses in the rear frame, the line through the optical centres of the objective and eye-piece lenses for one eye, intersects the line through the optical centres of the objective and eye-piece lenses for the other eye at the point where the image is focused, which is at a convenient distance for the object to be held or manipulated by the user of the glasses, as in reading, drawing, engraving, examining and manipulating the works of watches, and the like.

Figure 1:
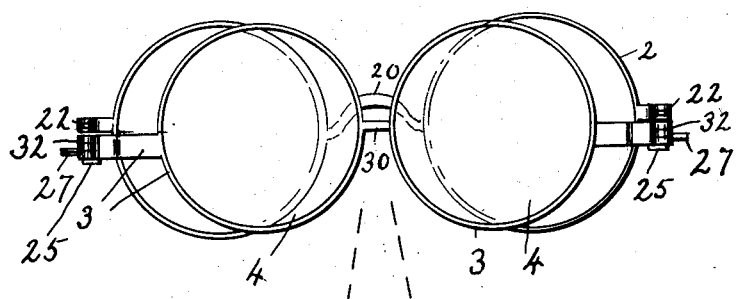
Fig. 1 is a front elevation of an optical instrument embodying this invention as seen looking towards the instrument when in use.

The instrument comprises two spectacle frames 2 and 3, the rear one of which is provided with a bridge or nose rest 20 and with bows 21 pivoted at 22 at the ends of the spectacle frame 2, so that they may be folded down upon the frame as usual when not in use, or may be turned substantially at right angles to the frame, as shown, so as to accommodate the temples and ears of the wearer in the usual manner.

The front spectacle frame 3 has the lens holding frames connected by a short bridge piece 30 and also has bows 31 pivotally connected with the ends of the frame at 32, the bows 31 of the front frame being adapted to lie alongside the bows 21 of the rear frame and to slide telescopically with relation thereto, so that the front frame and lenses therein may be supported at the proper distance in front of the rear frame 2 for proper focusing.

Figure 2:
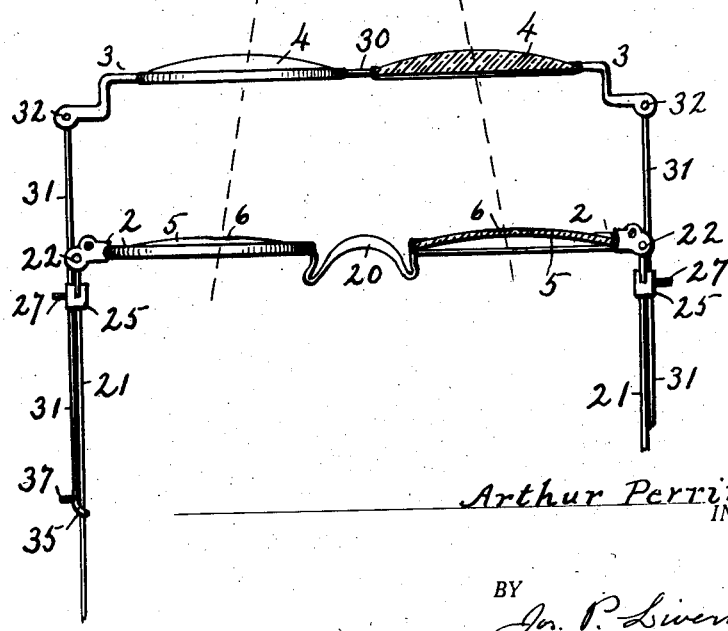
Fig. 2 is a plan view, partly in section, with the front and rear pairs of glasses in proper relative position for use, part of the right hand bows being broken away.

The pivot joints 22 and 32 are placed at a slightly different level, so that the one may lie wholly above the other, as shown in Fig. 1, and the bows 21 of the inner frame are provided with guide pieces 25 in which the bows of the outer frame may slide, while the bows 31 of the outer frame are provided at their ends with guide openings at 35, as appears at the left hand in Fig. 2, through which the bows 21 may slide, so that the bows of the outer spectacle frame may have a telescopic sliding movement relative to the bows of the inner frame, by which the two spectacle frames may be brought near together so that the bows may be folded down over them when not in use, and so that the outer frame may be adjusted to the proper distance from the inner frame for properly focusing the glasses when in use.

The guide pieces 25 of the bows of the inner frame are provided with projections 27, and the bows 31 of the outer frame are provided with similar projections 37 near their ends, which facilitate the manipulation of the bows in sliding the outer frame forward to a proper position for adjustment of the focus.

The lenses or object glasses 4 in the forward frame are convex, being here shown as plano convex, and have considerable magnifying power, and if used alone as spectacles directly in front of the eyes of the user would require that the object to be in focus should be so near the eyes that it would be difficult and practically impossible to bring it within the field of vision of both eyes.

The glasses 5 of the inner frame are preferably periscopic in shape, and may be practically plain or of uniform thickness, except for a small portion 6, near the middle part, which is concave or of negative dioptric number, and constitutes the eye-piece lens which in co-operation with the magnifying objective lens 4 enables the object to be properly in focus at a considerably greater distance from the objective lens than is the case without the co-operation of the concave or negative eye-piece lens.

The inner glasses 5, instead of being plain, may be concave or convex to suit the eye of the user when used alone as in ordinary vision without the co-operation of the objective lenses 4, and the curvature may be such that the proper concave or negative form to the eye-piece lens proper, at 6, may be made in some cases by grinding a plane or flat surface on the outer convex face of the lens, and in other cases by grinding such curvature in the outer surface as will, with the curvature of the inner surface, produce the desired negative dioptric number for the eye-piece.

These negative lens portions should be ground a little aside from the geometrical centre of the glass towards the nose bridge 20, as the lines of vision from the two eyes are more convergent than usual, and by having the optical centres of the objective lenses much nearer together than the optical centres of the eye-pieces proper 6, the effective lines of vision converge to a point not far in advance of the instrumment so that an object to be seen or manipulated may be readily held in the hands at a convenient distance for manipulation, while seen strongly magnified by both eyes of the user of the instrument.

I have found that for a microscopic optical instrument, that is, one for the purpose of magnifying near objects within the range of ordinary vision, the positive dioptric number of the convex or objective lens is greater than the negative dioptric number of the concave or eye-piece lens, as contrasted with telescopic instruments in which the positive dioptric number of the objective, is less than the negative number of the eye-piece, and I have obtained satisfactory results in a binocular instrument of the kind herein described, with a convex objective lens of positive number 7 dioptric, in combination with a —6 dioptric number for the concave eye-piece lens.

I believe that I am the first to employ in a microscopic instrument the combination of a convex objective with a concave eye-piece.

What I claim is:

1. An optical instrument comprising front and rear spectacle frames containing objective and eye-piece lenses respectively, said frames each having bows hinged thereto, and the bows of the respective frames being connected by guides which accommodate a relative sliding movement by which the objectives may be moved towards and from the eye-pieces, said eye-piece lenses having near their central portion a concave or negative lens, and the objective lenses being convex and of large magnifying power, the optical centres of the objective lenses being at substantially less distance apart than the optical centres of the eye-piece lenses whereby the lines of vision through the said eye-piece and objective lenses converge at an acute angle.

2. An optical instrument comprising front and rear spectacle frames containing objective and eye-piece lenses respectively, and having bows provided with guides for telescopic sliding movement of the bows of one frame relative to the bows of the other, the front or objective lenses being convex and having their optical centres nearer together than the optical centres of the rear or eye-piece lenses, said eye-piece lenses being similarly curved on their inner and outer surfaces, and having a portion of the outer surface near the middle ground to constitute with the curve of the inner surface a portion of negative dioptric number.

3. A binocular microscopic instrument comprising a pair of concave eye-piece lenses and a pair of convex objective lenses, the negative dioptric number of the concave lenses being smaller than the positive dioptric number of the objective lenses combined with a mounting supporting said lenses with the optical centers of the objective lenses nearer together than the optical centers of the eyepiece lenses.

4. An optical instrument comprising front and rear spectacle frames containing convex objective and concave eye-piece lenses respectively, and having bows connected for telescopic movement, the optical centres of the objective lenses being nearer together than the optical centres of the eye-piece lenses, and said eye-piece lenses being formed near the middle of periscopic glasses, but each at a slight distance from the geometrical centre of the glass at the side toward the other.

ARTHUR PERRIN.